(12) United States Patent
Karakkad Kesavan Namboodiri et al.

(10) Patent No.: US 11,388,671 B2
(45) Date of Patent: Jul. 12, 2022

(54) SELECTING REFERENCE SIGNAL OCCASIONS FOR WAKEUP

(71) Applicant: QUALCOMM Incorporated, San Diego, CA (US)

(72) Inventors: Vishnu Namboodiri Karakkad Kesavan Namboodiri, Hyderabad (IN); Arnab Pal, Kolkata (IN); Madhusudan Sathyanarayan, Hyderabad (IN); Utpal Barman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 134 days.

(21) Appl. No.: 17/009,963

(22) Filed: Sep. 2, 2020

(65) Prior Publication Data
US 2022/0070781 A1    Mar. 3, 2022

(51) Int. Cl.
*H04W 52/02* (2009.01)
*H04L 5/00* (2006.01)
*H04W 68/02* (2009.01)

(52) U.S. Cl.
CPC ....... *H04W 52/0235* (2013.01); *H04L 5/0048* (2013.01); *H04W 68/02* (2013.01)

(58) Field of Classification Search
None
See application file for complete search history.

(56) References Cited

U.S. PATENT DOCUMENTS

| | | | |
|---|---|---|---|
| 2015/0223085 A1* | 8/2015 | Siomina | H04W 52/0229 370/252 |
| 2019/0373554 A1* | 12/2019 | Wang | H04W 72/14 |
| 2021/0029635 A1* | 1/2021 | Meylan | H04W 72/0413 |
| 2021/0029773 A1* | 1/2021 | Majumder | H04W 36/14 |
| 2021/0337551 A1* | 10/2021 | Xia | H04W 24/10 |

* cited by examiner

*Primary Examiner* — Sai Aung
(74) *Attorney, Agent, or Firm* — Holland & Hart LLP

(57) ABSTRACT

Methods, systems, and devices for wireless communications are described. Multiple reference signal occasions may occur during an inactive period of a discontinuous reception cycle configured for a wireless device. An amount of time the UE will be awake during the discontinuous reception cycle if the UE wakes up during a reference signal occasion of the multiple reference signal occasions may be determined for each of the reference signal occasions. The UE may wake up during the reference signal occasion associated with the shortest amount of awake time relative to the other reference signal occasions.

30 Claims, 10 Drawing Sheets

SELECTING REFERENCE SIGNAL OCCASIONS FOR WAKEUP

FIELD OF TECHNOLOGY

The following relates to wireless communications, including selecting reference signal occasions for wakeup.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support power saving techniques, such as discontinuous reception (DRX) techniques. To support DRX operation, a base station may schedule data for a UE during designated intervals, and the UE may enter an inactive, power-saving state before and after an occurrence of the designated intervals.

SUMMARY

The described techniques relate to improved methods, systems, devices, and apparatuses that support selecting reference signal occasions for wakeup. To enable a wireless device to return to an inactive state after receiving a reference signal during an inactive period (and to minimize an amount of active time during the inactive period), a reference signal occasion that is farther in time from an active period may be selected for the wireless device to receive the reference signal. In some examples, a first reference signal occasion and a second reference signal may occur during an inactive period configured for a wireless device. The first reference signal occasion may be separated from the active period by a first duration, and the second reference signal occasion may be separated from the active period by a second duration that is greater than the first duration. Also, the first duration may be less than a threshold duration for the wireless device to transition between an inactive state and an active state, and the second duration may be greater than a threshold duration for the wireless device to transition between an inactive state and an active state. Thus, the wireless device may select the second reference signal occasion for receiving a reference signal.

A method for wireless communications at a UE is described. The method may include identifying a first period for operating in an inactive state and a second period for operating in an active state, identifying a first reference signal occasion that occurs during the first period and is separated from the second period by a first duration and a second reference signal occasion that occurs during the first period and is separated from the second period by a second duration that is greater than the first duration, and transitioning to the active state during the second reference signal occasion based on the first duration being less than a threshold duration for the UE to transition from the inactive state to the active state and the second duration being greater than the threshold duration.

An apparatus for wireless communications at a UE is described. The apparatus may include a processor, memory in electronic communication with the processor, and instructions stored in the memory. The instructions may be executable by the processor to cause the apparatus to identify a first period for operating in an inactive state and a second period for operating in an active state, identify a first reference signal occasion that occurs during the first period and is separated from the second period by a first duration and a second reference signal occasion that occurs during the first period and is separated from the second period by a second duration that is greater than the first duration, and transition to the active state during the second reference signal occasion based on the first duration being less than a threshold duration for the UE to transition from the inactive state to the active state and the second duration being greater than the threshold duration.

Another apparatus for wireless communications at a UE is described. The apparatus may include means for identifying a first period for operating in an inactive state and a second period for operating in an active state, means for identifying a first reference signal occasion that occurs during the first period and is separated from the second period by a first duration and a second reference signal occasion that occurs during the first period and is separated from the second period by a second duration that is greater than the first duration, and means for transitioning to the active state during the second reference signal occasion based on the first duration being less than a threshold duration for the UE to transition from the inactive state to the active state and the second duration being greater than the threshold duration.

A non-transitory computer-readable medium storing code for wireless communications at a UE is described. The code may include instructions executable by a processor to identify a first period for operating in an inactive state and a second period for operating in an active state, identify a first reference signal occasion that occurs during the first period and is separated from the second period by a first duration and a second reference signal occasion that occurs during the first period and is separated from the second period by a second duration that is greater than the first duration, and transition to the active state during the second reference signal occasion based on the first duration being less than a threshold duration for the UE to transition from the inactive state to the active state and the second duration being greater than the threshold duration.

Some examples of the method, apparatuses, and non-transitory computer-readable medium described herein may further include operations, features, means, or instructions for receiving a reference signal during the second reference signal occasion.

In some examples of the method, apparatuses, and non-transitory computer-readable medium described herein, the reference signal includes a synchronization signal block, phase tracking reference signal, remote interference management reference signal, sounding reference signal, demodulation reference signal, or channel state information reference signal.

Some examples of the method, apparatuses, and non-transitory computer-readable medium described herein may further include operations, features, means, or instructions for receiving or sending a data or control message during the second period based on the reference signal received during the second reference signal occasion.

Some examples of the method, apparatuses, and non-transitory computer-readable medium described herein may further include operations, features, means, or instructions for determining, for the first reference signal occasion and the second reference signal occasion, an amount of time the UE will be awake during the first period and the second period together if the UE wakes up during a respective reference signal occasion and selecting the second reference signal occasion for transitioning to the active state based at least in part on the second reference signal occasion being associated with a shorter amount of awake time than the first reference signal occasion.

In some examples of the method, apparatuses, and non-transitory computer-readable medium described herein, the second reference signal occasion may be associated with a shortest amount of time for the UE to operate in the active state relative to a plurality of reference signal occasions that occur during the first period, and the second reference signal occasion may be selected based on being associated with the shortest amount of time.

Some examples of the method, apparatuses, and non-transitory computer-readable medium described herein may further include operations, features, means, or instructions for identifying a third reference signal occasion that occurs during the first period and may be separated from the second period by a third duration that may be greater than the second duration and selecting the second reference signal occasion for transitioning to the active state based on the second duration being greater than the threshold duration, the third duration being greater than the second duration, and the first duration being less than the threshold duration.

Some examples of the method, apparatuses, and non-transitory computer-readable medium described herein may further include operations, features, means, or instructions for receiving a configuration message indicating a first length of the first period, a second length of the second period, or both, and a starting location of a cycle that includes the first period and the second period.

Some examples of the method, apparatuses, and non-transitory computer-readable medium described herein may further include operations, features, means, or instructions for configuring a connected discontinuous reception mode based on the configuration message, where a connection may be maintained with a base station throughout the first period and the second period based on the connected discontinuous reception mode being configured.

Some examples of the method, apparatuses, and non-transitory computer-readable medium described herein may further include operations, features, means, or instructions for receiving a configuration message indicating a periodicity of and starting location for a set of reference signal occasions, where the first reference signal occasion and the second reference signal occasion may be identified based on the configuration message.

Some examples of the method, apparatuses, and non-transitory computer-readable medium described herein may further include operations, features, means, or instructions for identifying a third reference signal occasion that occurs during the first period and may be separated from the second period by a third duration that may be less than the second duration and greater than the threshold duration, identifying a paging occasion that occurs during the first period and may be separated from the second period by a fourth duration that may be greater than the threshold duration, and selecting the second reference signal occasion based on a fifth duration between the second reference signal occasion and the paging occasion being greater than the threshold duration and a sixth duration between the third reference signal occasion and the paging occasion being less than the threshold duration.

In some examples of the method, apparatuses, and non-transitory computer-readable medium described herein, the UE includes a plurality of subscriber identification modules, and the first reference signal occasion and the second reference signal occasion being associated with a first subscription of the UE with a first operator and the paging occasion being associated with a second subscription of the UE with a second operator.

In some examples of the method, apparatuses, and non-transitory computer-readable medium described herein, the second period may be non-overlapping with the first reference signal occasion or the second reference signal occasion.

DETAILED DESCRIPTION

Figure 1:
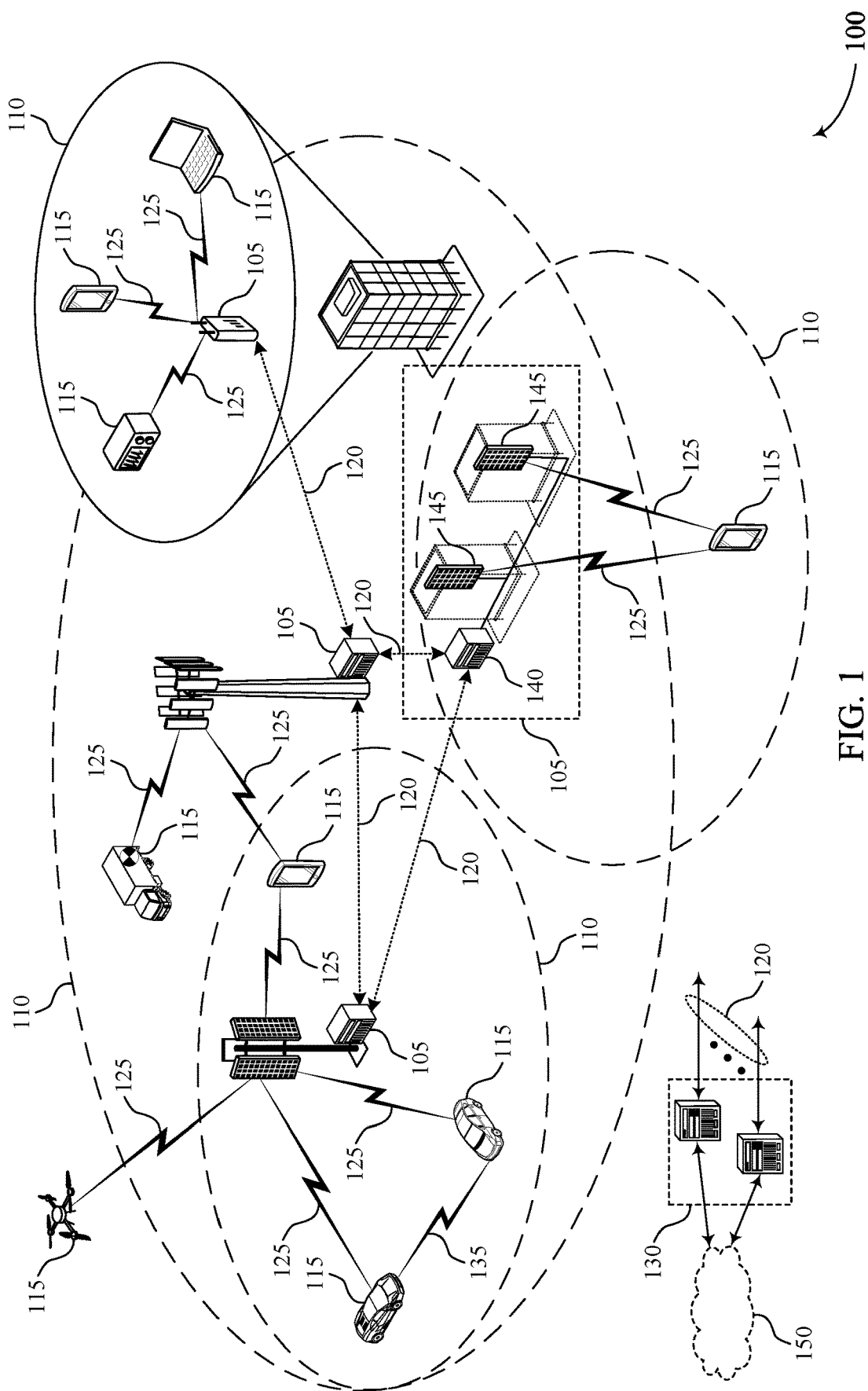
FIG. 1 illustrates an example of a system for wireless communications that supports selecting reference signal occasions for wakeup in accordance with aspects of the present disclosure.

A wireless device may configure a discontinuous reception (DRX) mode to save power. While operating in the DRX mode, the wireless device may configure an inactive state during an inactive period and an active state during an active period of a DRX cycle. The wireless device may be capable of transitioning between the inactive state and active state within a duration. A central node may refrain from transmitting control and user data to a wireless device during an inactive period configured for the wireless device. In some examples, to enable the wireless device to maintain a reliable connection with the central node throughout a DRX cycle, the wireless device may temporarily return to an active state to receive reference signals transmitted by the central node during an inactive period. Similarly, the wireless device may temporarily return to an active state to receive paging messages transmitted by another central node (managed by a different operator than the central node) during an inactive period.

The central node may transmit reference signals in a periodic fashion and, in some examples, may transmit a type of reference signal multiple times during an inactive period configured for a wireless device. Each instance of the reference signal type may be referred to as a reference signal occasion. In such cases, the wireless device may select the reference signal occasion that is closest in time to an active period configured for the wireless device for temporarily returning to the active state—e.g., to increase a correlation between a reference signal received during the reference signal occasion and a data transmission received during the active period. Returning, however, to the active state during the reference signal occasion that is closest in time to the active period may result in increased power consumption at a wireless device relative to if the wireless device were to return to the active state during a farther in time reference signal occasion. That is, if a duration between the reference signal occasion and the active period is less than a duration for the wireless device to transition from the inactive state to the active state, then the wireless device may be prevented from returning to the inactive state before the active period begins.

To enable the wireless device to return to the inactive state after receiving a reference signal during an inactive period (and to minimize an amount of active time during the inactive period), a reference signal occasion that occurs during the inactive period and that minimizes an amount of awake time during a DRX cycle may be selected. In some examples, a reference signal occasions that is farther in time from the active period may be selected for the wireless device to receive the reference signal. The first reference signal occasion and the second reference signal may occur during an inactive period configured for a wireless device. The first reference signal occasion may be separated from the active period by a first duration, and the second reference signal occasion may be separated from the active period by a second duration that is greater than the first duration—that is, the second reference signal occasion may be farther from the active period than the first reference signal occasion. Also, the first duration may be less than a threshold duration for the wireless device to transition between an inactive state and an active state, and the second duration may be greater than a threshold duration for the wireless device to transition between an inactive state and an active state. Thus, the wireless device may select the second reference signal occasion for receiving a reference signal. By selecting the second reference signal occasions, the wireless device may return to the inactive state before the active period begins. By contrast, the wireless device may be unable to return to the inactive state if the first reference signal occasion is selected—e.g., because the first duration between the first reference signal occasion and the active period may not be long enough to support the wireless device transitioning between the inactive and active states.

In some examples, a third reference signal occasion that is separated from the active period by a third duration that is greater than the second duration may occur during the inactive period. Thus, the third duration may also be greater than the threshold duration. The wireless device may select the second reference signal occasion for receiving the reference signal. By selecting the second reference signal occasion, time and frequency tracking and data decoding may be improved without increasing power consumption relative to the third reference signal occasion—e.g., because the second reference signal occasion is closer in time to the active period.

In some examples, a paging message is transmitted during the inactive period. The wireless device may similarly consider a duration between the paging message and the reference signal occasions that occur during the inactive period when determining which reference signal occasion to use for reference signal reception.

Aspects of the disclosure are initially described in the context of wireless communications systems. Aspects of the disclosure are then described in the context of a flow chart and timing diagrams for selecting reference signal occasions for wakeup. Aspects of the disclosure are further illustrated by and described with reference to apparatus diagrams, system diagrams, and flowcharts that relate to selecting reference signal occasions for wakeup.

FIG. 1 illustrates an example of a wireless communications system 100 that supports selecting reference signal occasions for wakeup in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A wireless communications system 100 may support scheduling measures that enable a UE 115 to save power. For example, a UE 115 may be configured to operate in a DRX mode to save power. While operating in the DRX mode, the UE 115 may configure an inactive state (e.g., a sleep state or deep sleep state) during a designated inactive (or sleep) period (e.g., a DRX-off period) and an active state during a designated active (or awake) period. The inactive period and the active period may collectively be referred to as a DRX cycle, which may continuously repeat.

In some examples, a duration for transitioning from an inactive state to an active state, and vice versa, may vary across UEs 115—e.g., some UEs 115 may transition from the inactive state to the active state more quickly than other UEs 115. In some examples, durations for the UE 115 to transition between an active state and different levels of inactivity may vary. For example, a duration for transitioning from a deep sleep state to an active state (e.g., 10 ms) may be longer than a duration for transitioning from a sleep state to the active state (e.g., 5 ms). While configured in the sleep state, the UE 115 may disable a first set of components. While configured in the deep sleep state, the UE 115 may disable at least a portion of the first set of and a second set of components. The UE 115 may consume a reduced amount of energy while configured in the deep sleep state relative to the sleep state, and may consume a reduced amount of energy while configured in the sleep state relative to the active state.

A base station 105 may refrain from scheduling control and data communications with the UE 115 during inactive periods that are configured for the UE 115. Thus, the UE 115 may avoid missing communications sent from the base station 105 while the UE is configured in an inactive state. In some examples, a base station 105 sends a configuration message that causes a UE 115 to enter a DRX mode. The configuration message may indicate a length of the active period for the UE 115—e.g., the active period may extend 1 ms, 2 ms, 5 ms, 10 ms, 20 ms, and so on. Additionally, or alternatively, the configuration message may also configure a length of the inactive period for the UE—e.g., the inactive period may extend 10 ms, 20 ms, 30 ms, 40 ms, 50 ms, and so on. In some examples, instead of indicating the length of both the inactive period and the active period, the configuration message may indicate a length of one of the inactive period or the active period and a total length of the DRX cycle—e.g., if the configuration message indicates a length of an active period and the total length of the DRX cycle, the UE 115 may determine a length of inactive period by determining the difference in the total length of the DRX cycle and the length of the active period. In some examples, the DRX cycle may extend 10 ms, 20 ms, 30 ms, 40 ms, and so on. In some examples, the total length of the DRX cycle is preconfigured at the UE 115.

In some examples, a UE 115 maintains a connection with the base station 105 throughout a DRX cycle—in such cases, the UE 115 may be referred to as being configured in a connected discontinuous reception (CDRX) mode. That is, the UE 115 may transition from an inactive state to an active state (which may also be referred to as waking up) and receive communications from the base station 105 during the active period without first resynchronizing with the base station 105 or reestablishing a radio resource connection with the base station 105. In order to maintain the connection with the base station 105, the UE 115 may be configured to wake up during the inactive period to measure one or more reference signals that are transmitted by the base station 105 during the inactive period. The reference signals transmitted by the base station 105 may include synchronization signal blocks (SSBs), tracking reference signals (TRSs) (e.g., phase TRSs (PTRSs), remote interference management reference signals (RIM-RSs), uplink and/or downlink demodulation reference signals (DMRSs), sounding reference signals (SRSs), channel state information reference signals (CSI-RSs) and/or other reference signals used to maintain synchronicity between the base station 105 and the UE 115. SSBs may include synchronization signals and a physical broadcast channel associated with a particular transmission beam and may be used by a UE 115 to synchronize with the base station 105. TRSs may be used by a UE 115 to perform time and frequency tracking with base station 105 and to determine path delay spread and Doppler spread. DMRSs may be used to determine an estimate of a data channel. CSI-RSs may be used to adapt transmission parameters. Sounding reference signals may be used to determine channel information, such as multipath fading, scattering, Doppler frequency, and power loss for a transmitted signal.

The base station 105 may transmit the reference signals in a periodic fashion. Each instance of reference signal transmission may be referred to as a reference signal occasion. For example, the base station 105 may transmit SSBs every 5 ms, 10 ms, 20 ms, 80 ms, or 160 ms. Each instance of SSB transmission may be referred to as an SSB occasion. Similarly, the base station 105 may transmit TRSs every 5 ms, 10 ms, 20 ms, 80 ms, or 160 ms. Each instance of TRS transmission may be referred to as a TRS occasion. Any of the reference signal occasions may be used by a UE 115 to perform measurements used to maintain a reliable connection between the base station and the UE 115. The UE 115 may use received reference signals to assist in the decoding of control and data transmissions that are subsequently received during the active period.

In some examples, a wireless communications system 100 may support UEs 115 that support multiple subscriber identification modules (SIMs)—such UEs 115 may be referred to as multi-SIM UEs 115. UEs 115 that use multiple SIMs may have multiple subscriptions with multiple operators and, thus, may concurrently connect with multiple networks within the wireless communications system 100 that are managed by different operators. In some examples, a UE 115 may configure a CDRX mode for communications originating from a network managed by a first operator and may transition between the active and inactive states in accordance with the CDRX cycle.

In some examples, a base station 105 in a network managed by a second operator transmits a paging message during an inactive period of the CDRX cycle. The paging message may be used to indicate to the UE 115 that the base station 105 has data to transmit to the UE 115 associated with a second subscription the UE 115 has with the network managed by the second operator. To support communications with the second operator, the UE 115 may be configured to wake up during the inactive period to receive the paging message. The base station 105 may transmit the paging messages in a periodic fashion. For example, the base station 105 may transmit the paging message every 5 ms, 10 ms, 20 ms, 80 ms, or 160 ms.

In some examples, multiple reference signal occasions may occur during an inactive period for a UE 115. Additionally, none of the reference signal occasions may occur during the active period for the UE 115. In such cases, the UE 115 may wake up during the reference signal occasion that is closest in time to the active period—e.g., because network and channel characteristics that exist when the reference signals received during the closest reference signal occasion may be more closely correlated with network and channel characteristic that exist when a subsequent control or data transmission is received during the active period. Also, the UE 115 may avoid additionally waking up during the farther in time reference signal occasions to save power.

Returning, however, to the active state during the reference signal occasion that is closest in time to the active period may result in increased power consumption at a wireless device (e.g., a UE 115) relative to if the wireless device were to return to the active state during a farther in time reference signal occasion. That is, if a duration between the reference signal occasion and the active period is less than a duration for the wireless device to transition from the inactive state to the active state, then the wireless device may be prevented from returning to the inactive state before the active period begins.

To enable the wireless device to return to the inactive state after receiving a reference signal during an inactive period (and to minimize an amount of active time during the inactive period), a reference signal occasion that is farther in time from the active period may be selected for the wireless device to receive the reference signal. In some examples, a first reference signal occasion and a second reference signal may occur during an inactive period configured for a wireless device. The first reference signal occasion may be separated from the active period by a first duration, and the second reference signal occasion may be separated from the active period by a second duration that is greater than the first duration that is, the second reference signal occasion may be farther from the active period than the first reference signal occasion. Also, the first duration may be less than a threshold duration for the wireless device to transition between an inactive state and an active state, and the second duration may be greater than a threshold duration for the wireless device to transition between an inactive state and an active state. Thus, the wireless device may select the second reference signal occasion for receiving a reference signal.

By selecting the second reference signal occasions, the wireless device may return to the inactive state before the active period begins. By contrast, the wireless device may be unable to return to the inactive state if the first reference signal occasion is selected—e.g., because the first duration between the first reference signal occasion and the active period may not be long enough to support the wireless device transitioning between the inactive and active states.

In some examples, a third reference signal occasion that is separated from the active period by a third duration that is greater than the second duration may occur during the inactive period. Thus, the third duration may also be greater than the threshold duration. The wireless device may select the second reference signal occasion for receiving the reference signal. By selecting the second reference signal occasion, time and frequency tracking and data decoding may be improved without increasing power consumption relative to the third reference signal occasion—e.g., because the second reference signal occasion is closer in time to the active period.

In some examples, a paging message is transmitted during the inactive period. The wireless device may similarly consider a duration between the paging message and the reference signal occasions that occur during the inactive period when determining which reference signal occasion to use for reference signal reception.

Figure 2:
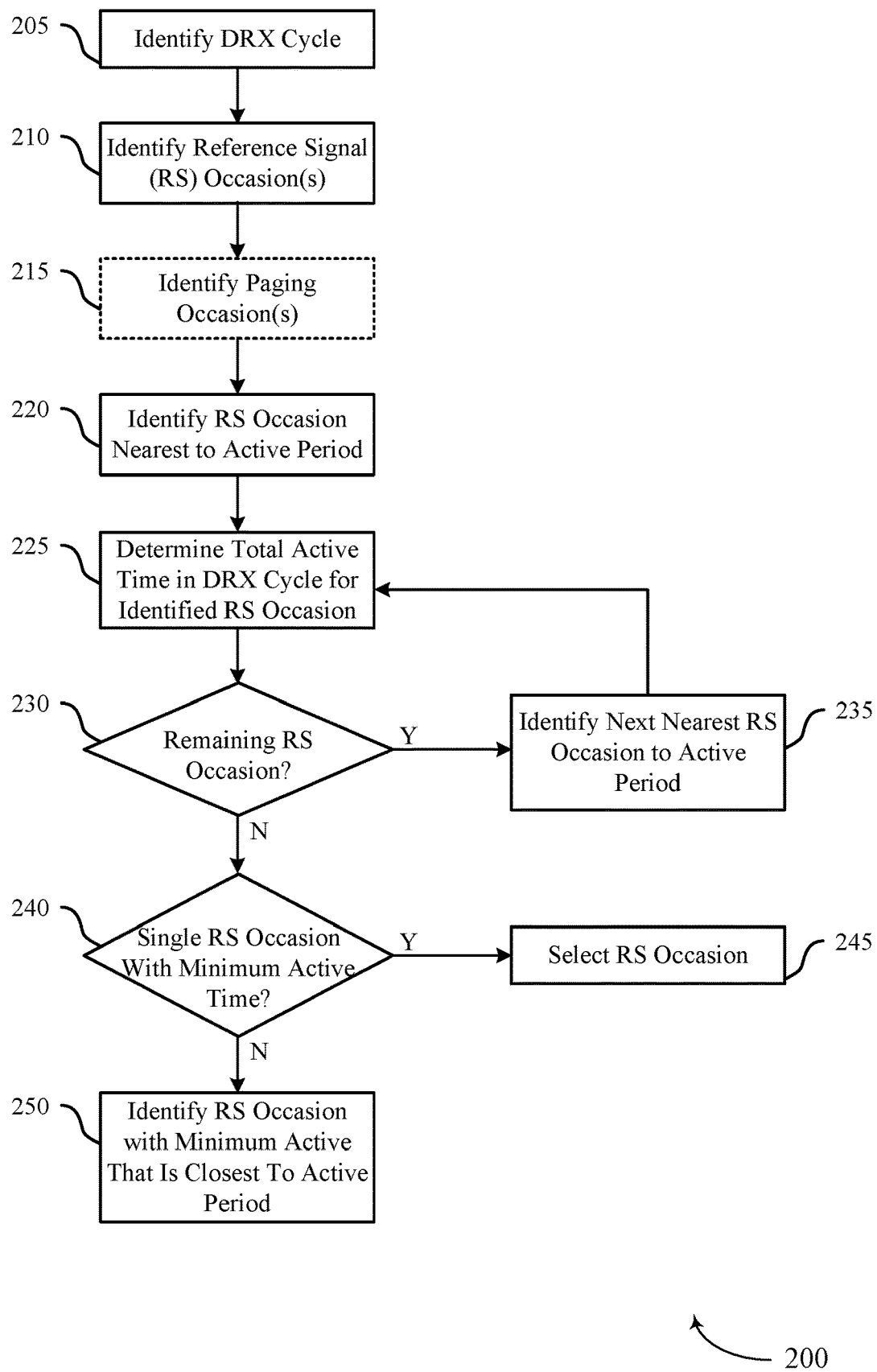
FIG. 2 illustrates an example of a set of operations that support selecting reference signal occasions for wakeup in accordance with aspects of the present disclosure.

FIG. 2 illustrates an example of a set of operations that support selecting reference signal occasions for wakeup in accordance with aspects of the present disclosure.

Flow chart 200 illustrates a set of operations that may be performed to identify a reference signal occasion for waking up during an inactive interval that minimizes an amount of awake time during a DRX cycle. The operations described in flow chart 200 may be rearranged or otherwise modified. In some examples one or more operations described in flow chart 200 may be omitted. The operations described in flow chart 200 may be performed at a UE that is configured to operate in a DRX mode, such as a UE 115 described with reference to FIG. 1. In some examples, the UE may have a single SIM or multiple (e.g., two) SIMs.

At block 205, the UE may determine parameters for a DRX cycle—e.g., based on being configured to operate in the DRX mode. The UE may receive an indication (e.g., in a control message) indicating a length of the DRX cycle, a length of an active period, a length of an inactive period, or any combination thereof. The UE may identify an inactive period and an active period based on the received indication.

At block 210, the UE may determine parameters for a reference signal (e.g., an SSB, TRS, RIM-RS, DMRS, CSI-RS, SRS, etc.). The UE may receive an indication of a set of communication resources that are used to convey the reference signal. The UE may receive an indication (e.g., in a control message) of a starting position (e.g., a subframe) and a periodicity for the reference signal indicating how often the reference signal is repeated. The UE may also receive an indication of frequency resources that are allocated to the reference signals. The UE may identify one or more reference signal occasions that occur during an inactive period based on the indicated reference signal locations—e.g., each reference signal occasion may correspond to a period during which the reference signal occurs.

At block 215, the UE may determine parameters for a paging occasion (e.g., a paging message associated with a second subscription)—e.g., when the UE is configured with multiple SIMs. The UE may receive an indication (e.g., in a control message) indicating a starting position and periodicity of the paging message. The UE may also receive an indication of frequency resources allocated to the paging message. In some examples, the UE may identify a paging occasion that occurs during the inactive period based on the indicated paging message locations.

At block 220, the UE may identify the reference signal occasion that is nearest in time to the active period. In some examples, the UE may use reference signal occasions that occur prior to the active period to identify the nearest reference signal occasion. In some examples, the nearest reference signal occasion overlaps with the active period. In other examples, the nearest reference signal is non-overlapping with the active period. In some examples, a duration between the nearest reference signal occasion and the active period (e.g., an end of the nearest reference signal occasion and a beginning of the active period) may be less than a threshold duration for the UE to transition between inactive and active states.

At block 225, the UE may determine, within a DRX cycle (or within an inactive period of the DRX cycle), a total amount of time during which the UE will be in an active state if the UE wakes up during the nearest reference signal occasion. Additionally, or alternatively, the UE may determine a total amount of time during which the UE will be in an inactive state. In some examples, the UE may determine a total amount of time the UE will be in a particular type of inactive state (e.g., a deep sleep state). In some examples, the UE determines whether the UE will reenter an inactive state (e.g., a deep sleep state) during the portion of the inactive interval that includes the duration between the reference signal occasion and the active period. In some examples, the UE will not reenter the inactive state if the duration between the reference signal occasion and the active period is smaller than a threshold duration for the UE to transition between the inactive and active states. In other examples, the UE may enter a first inactive state (a sleep state), but may not enter a second inactive state (e.g., a deep sleep state), if the duration between the reference signal occasion and the active period is smaller than a threshold duration for the UE to transition between the second inactive state and the active state. The UE may determine the total amount of time the UE will be in the active state based on determining whether the UE will return to the inactive state during the inactive period.

At diamond 230, the UE may determine whether there are any remaining reference signal occasions that occur during the inactive period for which the UE has not yet determined a total amount of time during which the UE will be in the active state. If the UE determines that the total amount of time has not been computed for one or more of the reference signal occasions, the UE may proceed to perform the operations described at block 235. Otherwise, the UE may proceed to perform the operations described at diamond 240.

At block 235, the UE may identify the next nearest reference signal occasion relative to the active period based on determining that there are remaining reference signals. In some examples, a duration between the next nearest reference signal occasion and the active period (e.g., an end of the nearest reference signal occasion and a beginning of the active period) may be greater than a threshold duration for the UE to transition between inactive and active states. The UE may then proceed to perform the operations described at block 225 and diamond 230.

At block 225, the UE may determine, within the DRX cycle (or within the inactive period of the DRX cycle), a second total amount of time during which the UE will be in an active state if the UE wakes up during the next nearest reference signal occasion. In some examples, the second total amount of time may be less than the previously total amount of time computed for the nearest reference signal occasion. In other examples, the second total amount of time may be greater than the previously total amount of time computed for the nearest reference signal occasion—e.g., if the nearest reference signal occasion overlaps with the active period.

At diamond 230, the UE may again determine whether there are any remaining reference signal occasions that occur during the inactive period for which the UE has not yet determined a total amount of time during which the UE will be in the active state (which may be referred to as an "activity duration"). If the UE determines that the total amount of time has not been computed for one or more of the reference signal occasions, the UE may proceed to perform the operations described at block 235. Otherwise, the UE may proceed to perform the operations described at diamond 240.

At diamond 240, the UE may compare the activity durations for the different reference signal occasions based on determining there are no remaining reference signal occasions. In some examples, the UE may determine that one or more of the reference signal occasions are associated with a smallest activity duration (e.g., 7 ms). In other examples, the UE may determine that one or more of the reference signal occasions are associated with a smallest activity duration. If the UE determines that a single reference signal occasion is associated with the smallest activity duration, the UE may proceed to perform the operations described at block 245. Otherwise, if the UE determines that multiple reference signal occasions are associated with the smallest activity duration, the UE may proceed to perform the operations described at block 250.

At block 245, the UE may select the single reference signal occasion associated with the smallest activity duration for transitioning to the active state (e.g., for waking up) and receive a reference signal.

At block 250, the UE may determine which of the reference signal occasions having the smallest activity durations are the closest in time to the active period. The UE may then select the single reference signal occasion of the reference signal occasions that is the closest to the active period for transitioning to the active state (e.g., for waking up) and receive a reference signal.

Figure 3:
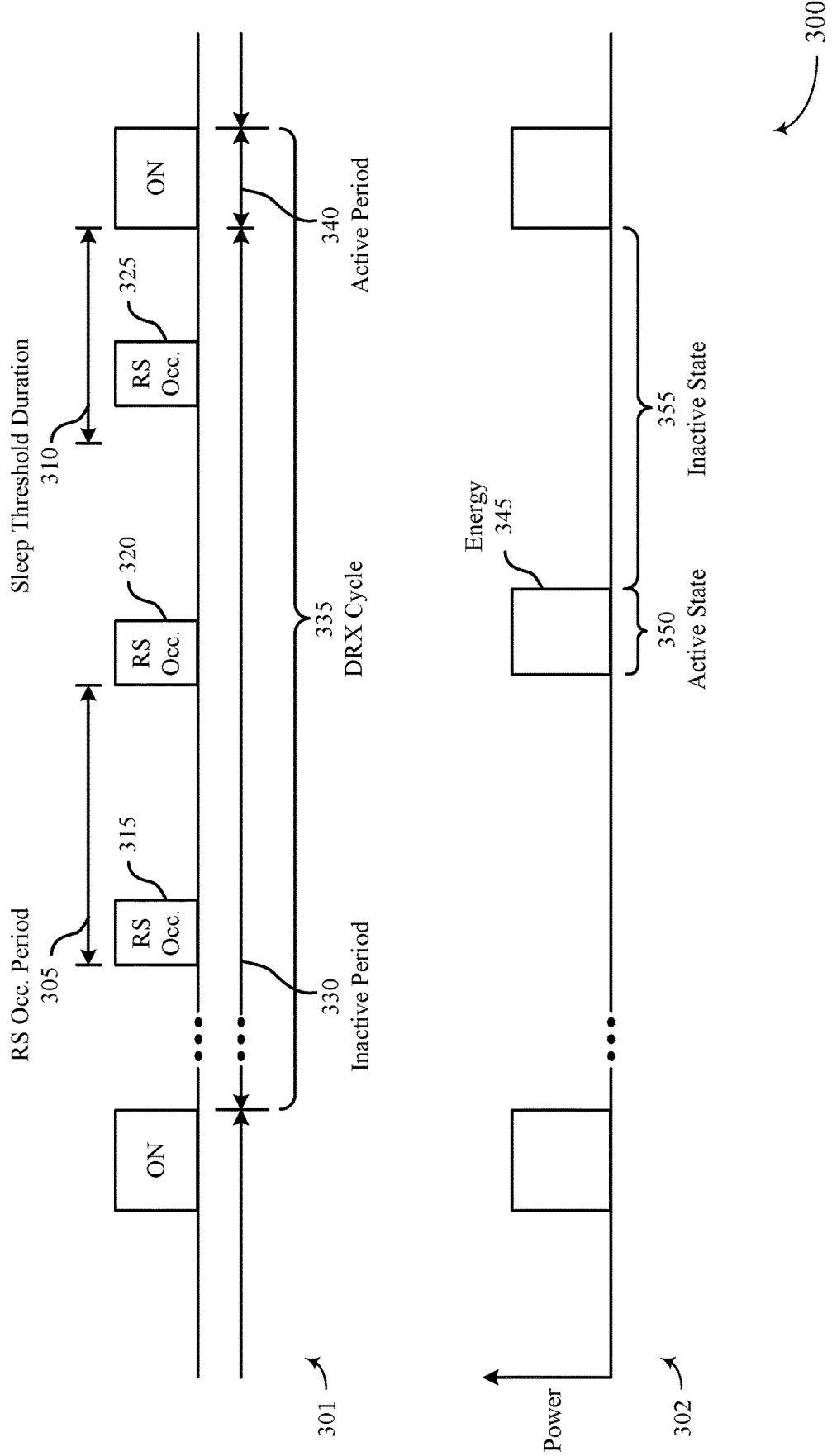
FIGS. 3 and 4 illustrate examples of timing diagrams for selecting reference signal occasions for wakeup in accordance with aspects of the present disclosure.

FIG. 3 illustrates an example of a timing diagram for selecting reference signal occasions for wakeup in accordance with aspects of the present disclosure.

Timing diagram 300 may depict power consumption at a UE with reference to the reception of one or more signals during a DRX cycle (e.g., DRX cycle 335) configured at the UE. The UE may be configured with a single SIM or multiple SIMs. Timing diagram 300 may include signal diagram 301 and power diagram 302. Signal diagram 301 may depict the reception of signals (e.g., reference, control, and data signals) at the UE with reference to DRX cycle 335. Power diagram 302 may depict the energy consumed by the UE with reference to the DRX cycle 335.

As depicted in signal diagram 301, three or more reference signal occasions may occur during inactive period 330 of DRX cycle 335. Each reference signal occasion may be separated in accordance with a length of reference signal occasion period 305—e.g., 5 ms, 10 ms, 20 ms, 40 ms, 80 ms, 160 ms, and so on. Each reference signal occasion may be associated with an SSB transmission, a TRS transmission, an RIM-RS transmission, a CSI-RS transmission, an SRS transmission, or an UL or DL DMRS transmission. The UE may determine the locations of each reference signal occasion based on a preconfiguration or a received configuration message.

First reference signal occasion 325 may be nearest in time to active period 340. A duration between first reference signal occasion 325 and active period 340 may be less than sleep threshold duration 310. Sleep threshold duration 310 may be associated with an amount of time for a UE to transition between an active state and an inactive state (e.g., a deep sleep). Thus, if the UE were to wake up during first reference signal occasion 325, the UE may be unable to return to the inactive state before a beginning of active period 340.

Second reference signal occasion 320 may be next nearest in time to active period 340. A duration between first reference signal occasion 325 and active period 340 may be greater than sleep threshold duration 310. Thus, if the UE were to wake up during second reference signal occasion 320, the UE may be able to return to the inactive state before a beginning of active period 340.

Third reference signal occasion 315 may be the farthest from active period 340 (relative to first reference signal occasion 325 and second reference signal occasion 320). A duration between first reference signal occasion 325 and active period 340 may also be greater than sleep threshold duration 310. Thus, if the UE were to wake up during third reference signal occasion 315, the UE may be able to return to the inactive state before a beginning of active period 340.

As described herein and with reference to FIG. 2, the UE may select one of the reference signal occasions that occur during inactive period 330 to receive a reference signal. To select one of the reference signal occasions, the UE may compute an activity duration for each of the reference signal occasions. The UE may compute the activity duration by computing all of the intervals during inactive period 330 during which the UE is in an active state. Additionally, or alternatively, the UE may estimate, for each reference signal occasion, an amount of power that will be consumed during inactive period 330. The UE may then select the reference signal occasion for which the smallest activity duration (or smallest amount of power consumption) is computed. In some examples, the UE may determine that multiple reference signal occasions are associated with the smallest activity duration, in which case, the UE may select the reference signal occasion of the multiple reference signal occasions that is closest to active period 340.

As depicted in FIG. 3, the UE may select second reference signal occasion 320 for transitioning to the active state during inactive period 330. The UE may not select first reference signal occasion 325 based on determining that an activity duration for first reference signal occasion 325 is greater than an activity duration for second reference signal occasion 320—e.g., based on determining that the UE will be unable to return to an inactive state before active period 340 begins. The UE may also not select third reference signal occasion 315 based on determining that an activity duration for third reference signal occasion 315 is greater than an activity duration for second reference signal occasion 320. Alternatively, the UE may also not select third reference signal occasion 315 after determining that the activity duration for third reference signal occasion 315 is equivalent to (e.g., within a percentage range of) an activity duration for second reference signal occasion 320 based on determining that third reference signal occasion 315 is farther in time from active period 340 than second reference signal occasion 320.

Thus, the UE may enter active state 350 during second reference signal occasion 320 to receive a reference signal (e.g., an SSB, TRS, RIM-RS, DMRS, SRS, or CSI-RS) transmitted during second reference signal occasion 320. While in active state 350, the UE may consume first amount of energy 345. A value of first amount of energy 345 may be computed by determining the area of first amount of energy 345—e.g. by multiplying the power level by the amount of time the UE is in active state 350. After receiving and, in some examples, processing the reference signal, the UE may return to inactive state 355 until active period 340 begins. In some examples, inactive state 355 is associated with a first inactivity level (and may be referred to as a deep sleep state). In some examples, other inactive states are supported by the UE that have different inactivity level—e.g., an inactive state having a second inactivity level that consumes more power than the first inactivity level may be referred to as a sleep state. In such examples, the UE may select a reference signal occasion based on the activity duration. Additionally, or alternatively, the UE may select a reference signal occasion based on an estimated amount of power that will be consumed considering the additional inactivity states.

In some examples, if the UE wakes up during first reference signal occasion 325 instead of during second reference signal occasion 320, the UE may consume an amount of energy during inactive period 330 that is equivalent to the first amount of energy 345 and an additional amount of energy (e.g., half of the first amount of energy) in the duration between the end of first reference signal occasion 325 and the beginning of active period 340. Thus, by waking up during second reference signal occasion 320, the UE may decrease an amount of power consumed during inactive period 330. And by waking up during second reference signal occasion 320 rather than third reference signal occasion 315, the UE may increase a tracking and decoding performance during active period 340 without increasing power consumption relative to waking up during third reference signal occasion 315.

In some examples, the UE may determine that an activity duration is minimized based on selecting first reference signal occasion 325, despite first reference signal occasion 325 falling within sleep threshold duration 310. In such cases, the UE may select first reference signal occasion 325 for transitioning to the active state.

Figure 4:
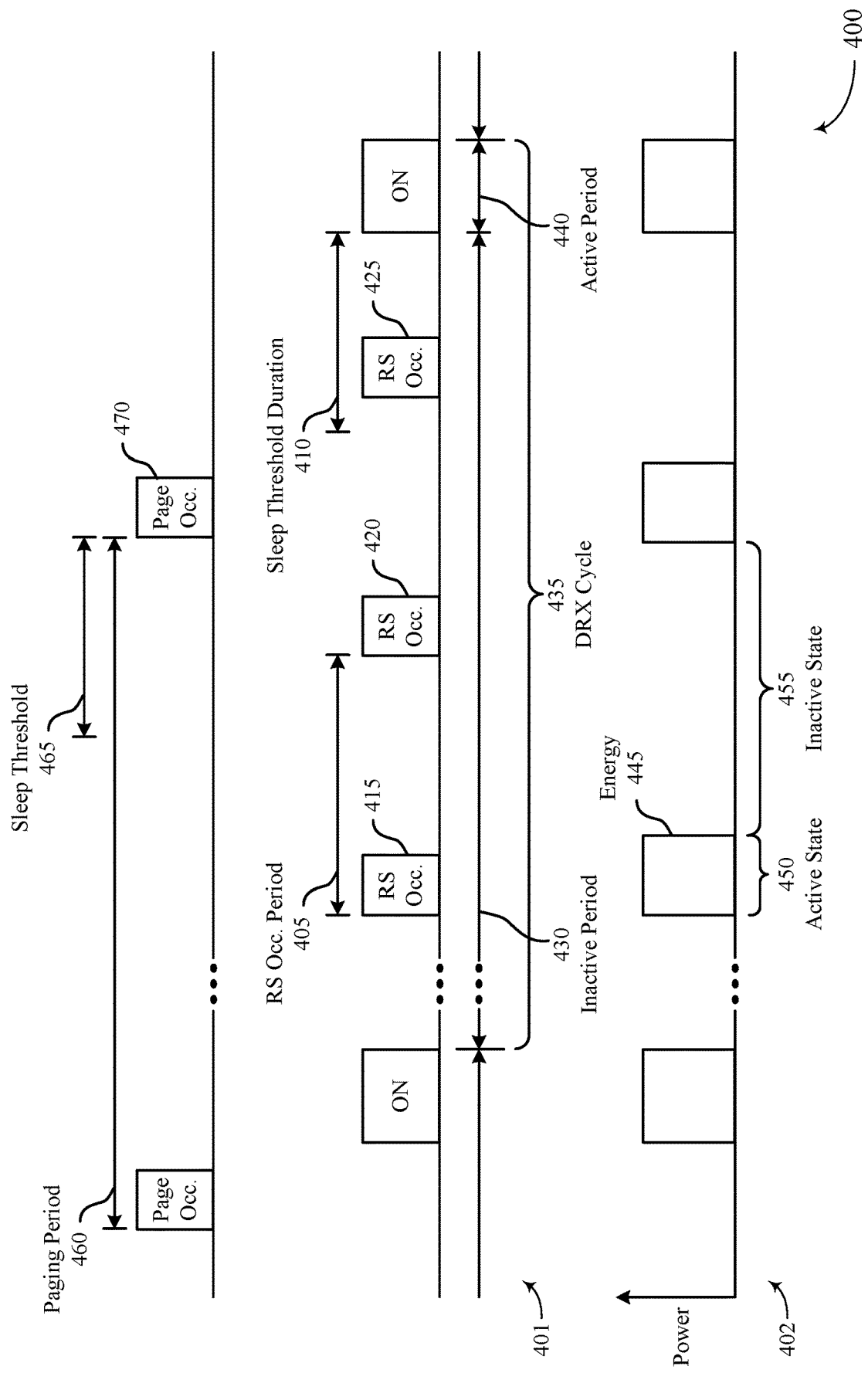

FIG. 4 illustrates an example of a timing diagram for selecting reference signal occasions for wakeup in accordance with aspects of the present disclosure.

Timing diagram 400 may depict power consumption at a UE with reference to the reception of one or more signals during a DRX cycle (e.g., DRX cycle 435) configured at the UE. The UE may be configured with multiple SIMs. Timing diagram 400 may include signal diagram 401 and power diagram 402. Signal diagram 401 may depict the reception of signals (e.g., reference, paging, control, and data signals) at the UE with reference to DRX cycle 335. Signal diagram 401 may also depict paging signals on a separate time axis than reference, control, and data signals. Power diagram 302 may depict the energy consumed by the UE with reference to the DRX cycle 335.

As described with reference to FIG. 3, each reference signal occasion may be separated in accordance with a length of reference signal occasion period 405. Also, sleep threshold duration 410 may be associated with an amount of time for a UE to transition between an active state and an inactive state (e.g., a deep sleep). Sleep threshold duration 465 may be equivalent to sleep threshold duration 410.

As described with reference to FIG. 3, the UE may determine which of multiple reference signal occasions that occur during inactive period 430 will minimize an activity duration during DRX cycle 435, while also considering the reception of paging messages from a network managed by a separate operator. Paging message may be transmitted periodically in accordance with paging period 460. As similarly described herein, the UE may compute, for each of the reference signal occasions, an activity duration that considers the effect of waking up to receive a paging message during paging occasion 470.

As depicted in FIG. 3, the UE may select third reference signal occasion 415 for transitioning to the active state during inactive period 330. The UE may not select first reference signal occasion 425 based on determining (in accordance with sleep threshold duration 410) that the UE will be unable to return to an inactive state in both (1) the duration between paging occasion 470 and first reference signal occasion 425 and (2) the duration between first reference signal occasion 425 and a beginning of active period 440—and, thus, that an activity duration for first reference signal occasion 425 is greater than an activity duration for third reference signal occasion 415. The UE may not select second reference signal occasion 420 based on determining that the UE will be unable to return to an inactive state in the duration between second reference signal occasion 420 and paging occasion 470 and, thus, that an activity duration for second reference signal occasion 420 is greater than an activity duration for third reference signal occasion 415.

Thus, the UE may enter active state 450 during third reference signal occasion 415 to receive a reference signal (e.g., an SSB, TRS, RIM-RS, CSI-RS, DMRS, or SRS) transmitted during third reference signal occasion 415. While in active state 350, the UE may consume first amount of energy 445. After receiving and, in some examples, processing the reference signal, the UE may return to inactive state 455 until paging occasion 470 occurs. When paging occasion 470 occurs, the UE may transition to the active state to receive a paging message, and may consume a second amount of energy. After receiving and, in some examples, processing the paging message, the UE may return to the inactive state until active period 440 begins.

In some examples, if paging occasion 470 occurs in the duration between a beginning of first reference signal occasion 425 and an end of active period 440, the UE may select first reference signal occasion 425 for waking up. In such cases, waking up during first reference signal occasion 425 may minimize the activity duration and/or the amount of power consumed during inactive period 430 while providing an improved tracking and decoding performance relative to waking up during second reference signal occasion 420 or third reference signal occasion 415.

Figure 5:
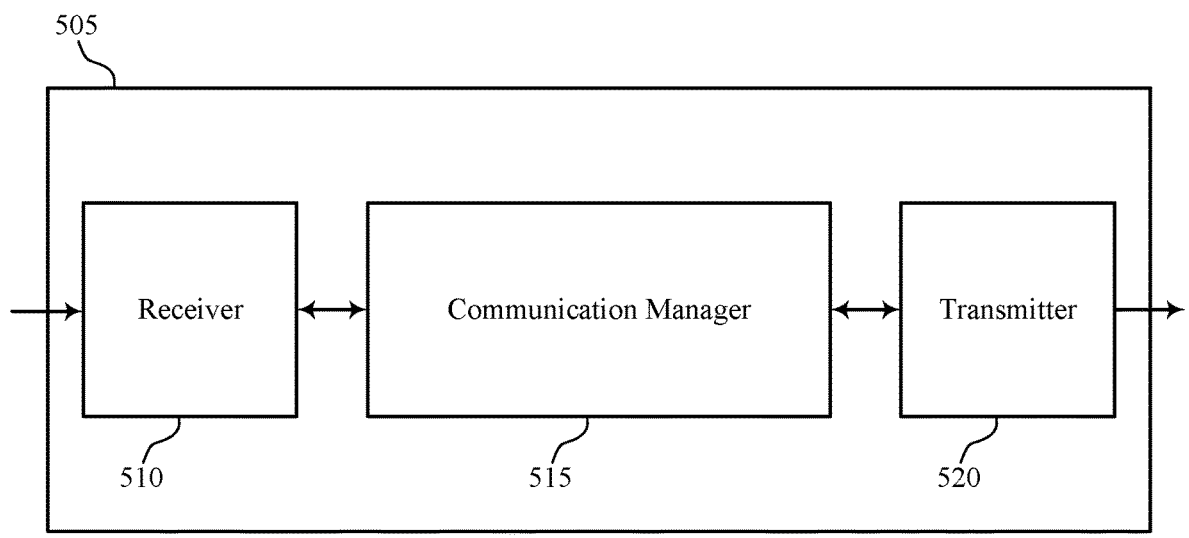
FIGS. 5 and 6 show block diagrams of devices that support selecting reference signal occasions for wakeup in accordance with aspects of the present disclosure.

FIG. 5 shows a block diagram 500 of a device 505 that supports selecting reference signal occasions for wakeup in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may provide a means for receiving information such as packets, user data, or control information associated with various information channels (e.g., control channels, data channels, and information related to selecting reference signal occasions for wakeup, etc.). Information may be passed on to other components of the device 505. The receiver 510 may utilize a single antenna or a plurality of antennas.

The transmitter 520 may provide a means for transmitting signals generated by other components of the device 505. In some examples, the transmitter 520 may be collocated with a receiver 510 in a transceiver module. The transmitter 520 may utilize a single antenna or a plurality of antennas.

The communication manager 515, or various components thereof, may be an example of a means for performing various aspects of selecting reference signal occasions for wakeup as described herein. The communication manager 515, or its sub-components, may be implemented in hardware (e.g., in communications management circuitry), code (e.g., software or firmware) executed by a processor, or any combination thereof. If implemented in code executed by a processor, the functions of the communication manager 515, or its sub-components may be executed by a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described in the present disclosure. In some examples the communication manager 515 may be configured to perform various operations (e.g. receiving, monitoring, transmitting) using or otherwise in cooperation with the receiver 510, the transmitter 520, or both.

The communication manager 515 may support wireless communications at a user equipment (UE) in accordance with examples as disclosed herein. For example, the communication manager 515 may be configured to provide or support a means for identifying a first period for operating in an inactive state and a second period for operating in an active state. The communication manager 515 may be configured to provide or support a means for identifying a first reference signal occasion that occurs during the first period and is separated from the second period by a first duration and a second reference signal occasion that occurs during the first period and is separated from the second period by a second duration that is greater than the first duration. The communication manager 515 may be configured to provide or support a means for transitioning to the active state during the second reference signal occasion based at least in part on the first duration being less than a threshold duration for the UE to transition from the inactive state to the active state and the second duration being greater than the threshold duration.

The communication manager 515 as described herein may be implemented to realize one or more potential advantages. One implementation may allow for reduced power consumption. That is, by minimizing an amount of active time during an inactive period, an amount of power consumed by a device (and/or a communication component within the device) may be reduced. Another implementation may allow for reduced power consumption while improving measurements used for processing subsequent communications. That is, by selecting a reference signal occasion that is closest to a downlink occasions from multiple reference signal occasions that can be used to minimize the active time, a subsequent communication can be performed with an increased likelihood of success.

Figure 6:
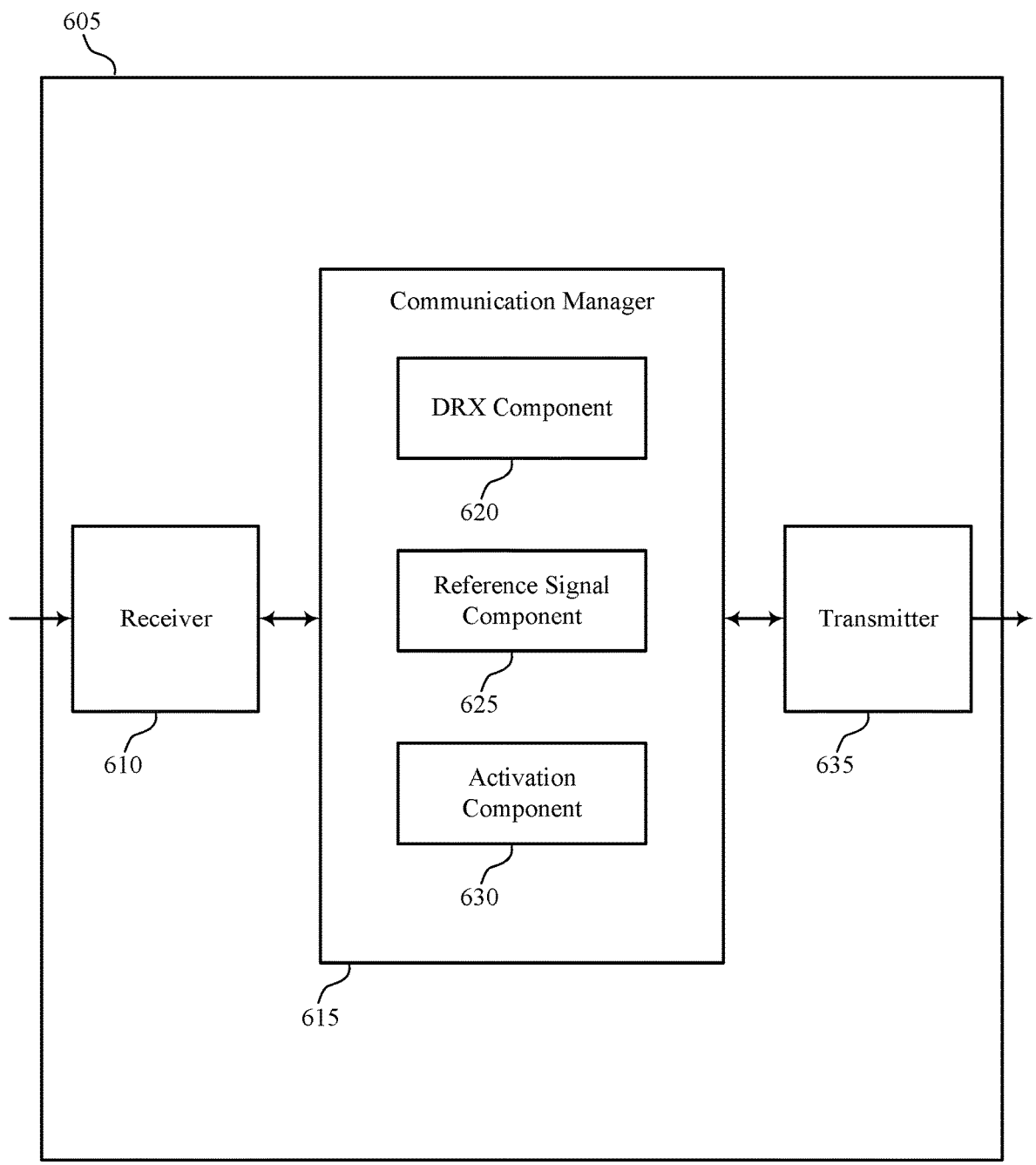

FIG. 6 shows a block diagram 600 of a device 605 that supports selecting reference signal occasions for wakeup in accordance with aspects of the present disclosure. The device 605 may be an example of aspects of a device 505 or a UE 115 as described herein. The device 605 may include a receiver 610, a communication manager 615, and a transmitter 635. The device 605 may also include a processor. Each of these components may be in communication with one another (e.g., via one or more buses).

The receiver 610 may provide a means for receiving information such as packets, user data, or control information associated with various information channels (e.g., control channels, data channels, and information related to selecting reference signal occasions for wakeup, etc.). Information may be passed on to other components of the device 605. The receiver 610 may utilize a single antenna or a set of antennas.

The transmitter 635 may provide a means for transmitting signals generated by other components of the device 605. In some examples, the transmitter 635 may be collocated with a receiver 610 in a transceiver module. The transmitter 635 may utilize a single antenna or a set of antennas.

The device 605, or various components thereof, may be an example of means for performing various aspects of selecting reference signal occasions for wakeup as described herein. For example, the communication manager 615 may include a DRX component 620, a reference signal component 625, an activation component 630, or any combination thereof. In some examples, the communication manager 615, or various components thereof, may be configured to perform various operations (e.g., receiving, monitoring, transmitting) using or otherwise in cooperation with the receiver 610, the transmitter 635, or both.

The communication manager 615 may support wireless communications at a UE in accordance with examples as disclosed herein. The DRX component 620 may be configured to provide or support a means for identifying a first period for operating in an inactive state and a second period for operating in an active state. The reference signal component 625 may be configured to provide or support a means for identifying a first reference signal occasion that occurs during the first period and is separated from the second period by a first duration and a second reference signal occasion that occurs during the first period and is separated from the second period by a second duration that is greater than the first duration. The activation component 630 may be configured to provide or support a means for transitioning to the active state during the second reference signal occasion based on the first duration being less than a threshold duration for the UE to transition from the inactive state to the active state and the second duration being greater than the threshold duration.

Figure 7:
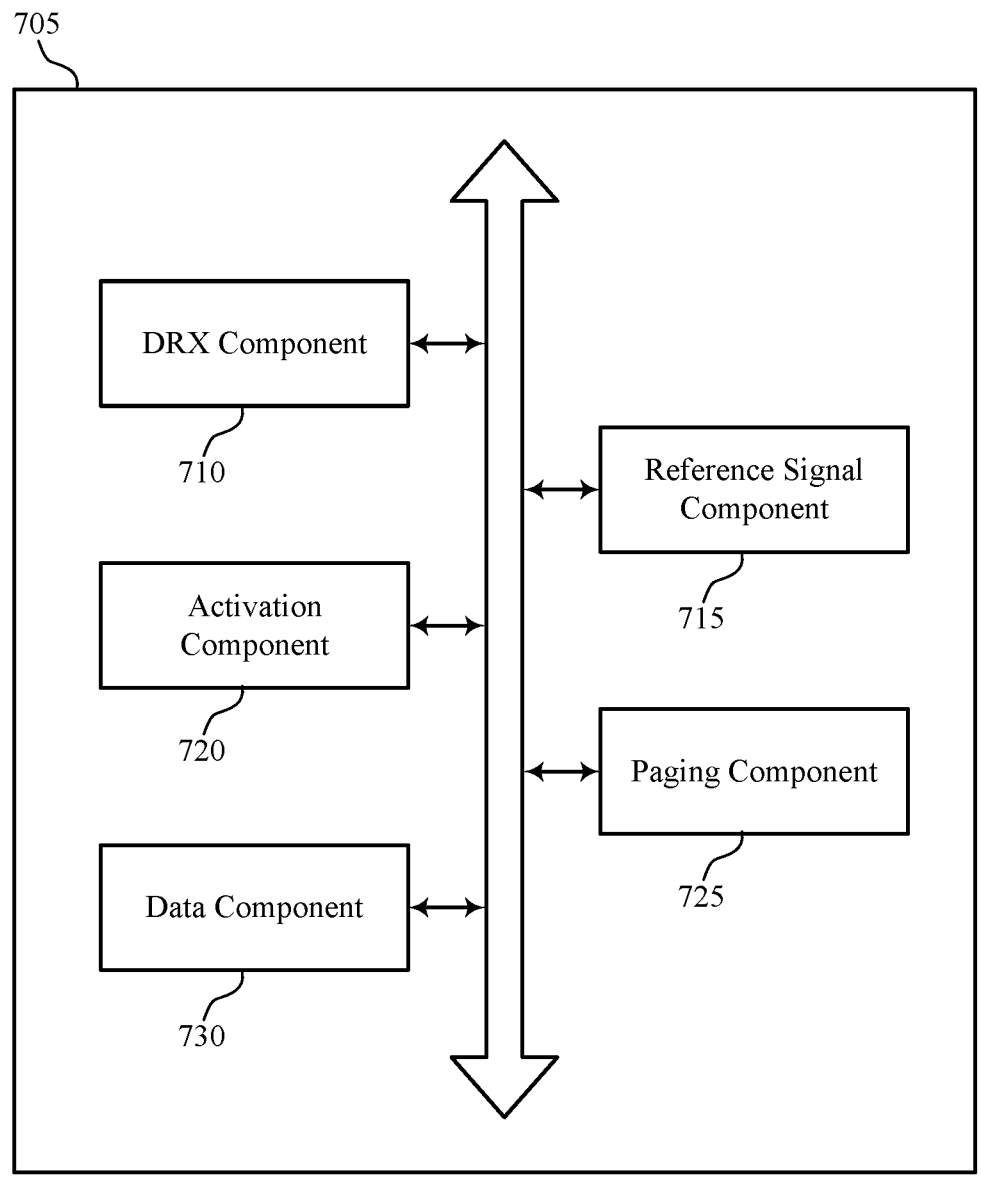
FIG. 7 shows a block diagram of a communication manager that supports selecting reference signal occasions for wakeup in accordance with aspects of the present disclosure.

FIG. 7 shows a block diagram 700 of a communication manager 705 that supports selecting reference signal occasions for wakeup in accordance with aspects of the present disclosure. The communication manager 705 may be an example of aspects of a communication manager 515, a communication manager 615, a communication manager 810, or both, as described herein. The communication manager 705, or various components thereof, may be an example of means for performing various aspects of selecting reference signal occasions for wakeup as described herein. For example, the communication manager 705 may include a DRX component 710, a reference signal component 715, an activation component 720, a paging component 725, a data component 730, or any combination thereof. Each of these components may communicate, directly or indirectly, with one another (e.g., via one or more buses).

The communication manager 705 may support wireless communications at a UE in accordance with examples as disclosed herein. The DRX component 710 may be configured to provide or support a means for identifying a first period for operating in an inactive state and a second period for operating in an active state. The reference signal component 715 may be configured to provide or support a means for identifying a first reference signal occasion that occurs during the first period and is separated from the second period by a first duration and a second reference signal occasion that occurs during the first period and is separated from the second period by a second duration that is greater than the first duration. The activation component 720 may be configured to provide or support a means for transitioning to the active state during the second reference signal occasion based on the first duration being less than a threshold duration for the UE to transition from the inactive state to the active state and the second duration being greater than the threshold duration.

In some examples, the reference signal component 715 may be configured to provide or support a means for receiving a reference signal during the second reference signal occasion.

In some examples, the reference signal includes a synchronization signal block, tracking reference signal, sounding reference signal, demodulation reference signal, or channel state information reference signal.

In some examples, the data component 730 may be configured to provide or support a means for receiving a data message during the second period based on the reference signal received during the second reference signal occasion.

In some examples, the DRX component 710 may be configured to provide or support a means for determining, for the first reference signal occasion and the second reference signal occasion, an amount of time the UE will be awake during the first period and the second period together if the UE wakes up during a respective reference signal occasion. In some examples, the reference signal component 715 may be configured to provide or support a means for selecting the second reference signal occasion for transitioning to the active state based on the second reference signal occasion being associated with a shorter amount of awake time than the first reference signal occasion.

In some examples, the reference signal component 715 may be configured to provide or support a means for identifying a third reference signal occasion that occurs during the first period and is separated from the second period by a third duration that is greater than the second duration. In some examples, the reference signal component 715 may be configured to provide or support a means for selecting the second reference signal occasion for transitioning to the active state based on the second duration being greater than the threshold duration, the third duration being greater than the second duration, and the first duration being less than the threshold duration.

In some examples, the DRX component 710 may be configured to provide or support a means for receiving a configuration message indicating a first length of the first period, a second length of the second period, or both, and a starting location of a cycle that includes the first period and the second period.

In some examples, the DRX component 710 may be configured to provide or support a means for configuring a connected discontinuous reception mode based on the configuration message, where a connection is maintained with a base station throughout the first period and the second period based on the connected discontinuous reception mode being configured.

In some examples, the reference signal component 715 may be configured to provide or support a means for receiving a configuration message indicating a periodicity of and starting location for a set of reference signal occasions, where the first reference signal occasion and the second reference signal occasion are identified based on the configuration message.

In some examples, the reference signal component 715 may be configured to provide or support a means for identifying a third reference signal occasion that occurs during the first period and is separated from the second period by a third duration that is less than the second duration and greater than the threshold duration. In some examples, the paging component 725 may be configured to provide or support a means for identifying a paging occasion that occurs during the first period and is separated from the second period by a fourth duration that is greater than the threshold duration. In some examples, the reference signal component 715 may be configured to provide or support a means for selecting the second reference signal occasion based on a fifth duration between the second reference signal occasion and the paging occasion being greater than the threshold duration and a sixth duration between the third reference signal occasion and the paging occasion being less than the threshold duration.

In some examples, the second period is non-overlapping with the first reference signal occasion or the second reference signal occasion.

Figure 8:
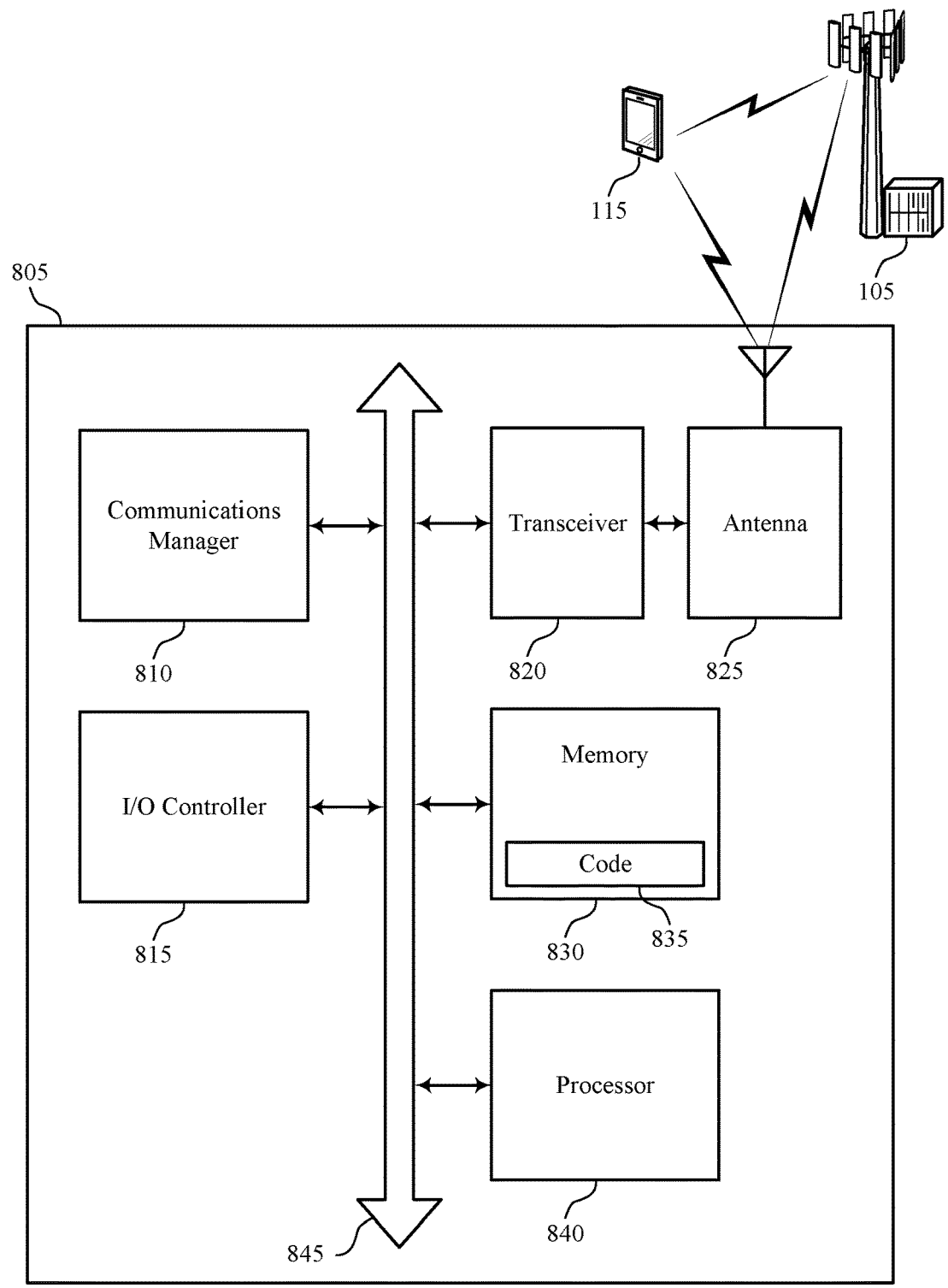
FIG. 8 shows a diagram of a system including a device that supports selecting reference signal occasions for wakeup in accordance with aspects of the present disclosure.

FIG. 8 shows a diagram of a system 800 including a device 805 that supports selecting reference signal occasions for wakeup in accordance with aspects of the present disclosure. The device 805 may be an example of or include the components of device 505, device 605, or a UE 115 as described herein. The device 805 may communicate wirelessly with one or more base stations 105, UEs 115, or any combination thereof. The device 805 may include components for bi-directional voice and data communications including components for transmitting and receiving communications, including a communication manager 810, a transceiver 820, an antenna 825, a memory 830, and a processor 840. These components may be in electronic communication or otherwise coupled (e.g., operatively, communicatively, functionally, electronically, electrically) via one or more buses (e.g., bus 845).

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

In some cases, the wireless device may include a single antenna 825. However, in some cases the device may have more than one antenna 825, which may be capable of concurrently transmitting or receiving multiple wireless transmissions. The transceiver 820 may communicate bi-directionally, via the one or more antennas 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the one or more antennas 825. The transceiver 820 may be an example of a transmitter 520, a transmitter 635, a receiver 510, a receiver 610, or any combination thereof, as described herein. The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting selecting reference signal occasions for wakeup).

The communication manager 810 may support wireless communications at a UE in accordance with examples as disclosed herein. For example, the communication manager 810 may be configured to provide or support a means for identifying a first period for operating in an inactive state and a second period for operating in an active state. The communication manager 810 may be configured to provide or support a means for identifying a first reference signal occasion that occurs during the first period and is separated from the second period by a first duration and a second reference signal occasion that occurs during the first period and is separated from the second period by a second duration that is greater than the first duration. The communication manager 810 may be configured to provide or support a means for transitioning to the active state during the second reference signal occasion based on the first duration being less than a threshold duration for the UE to transition from the inactive state to the active state and the second duration being greater than the threshold duration.

Figure 9:
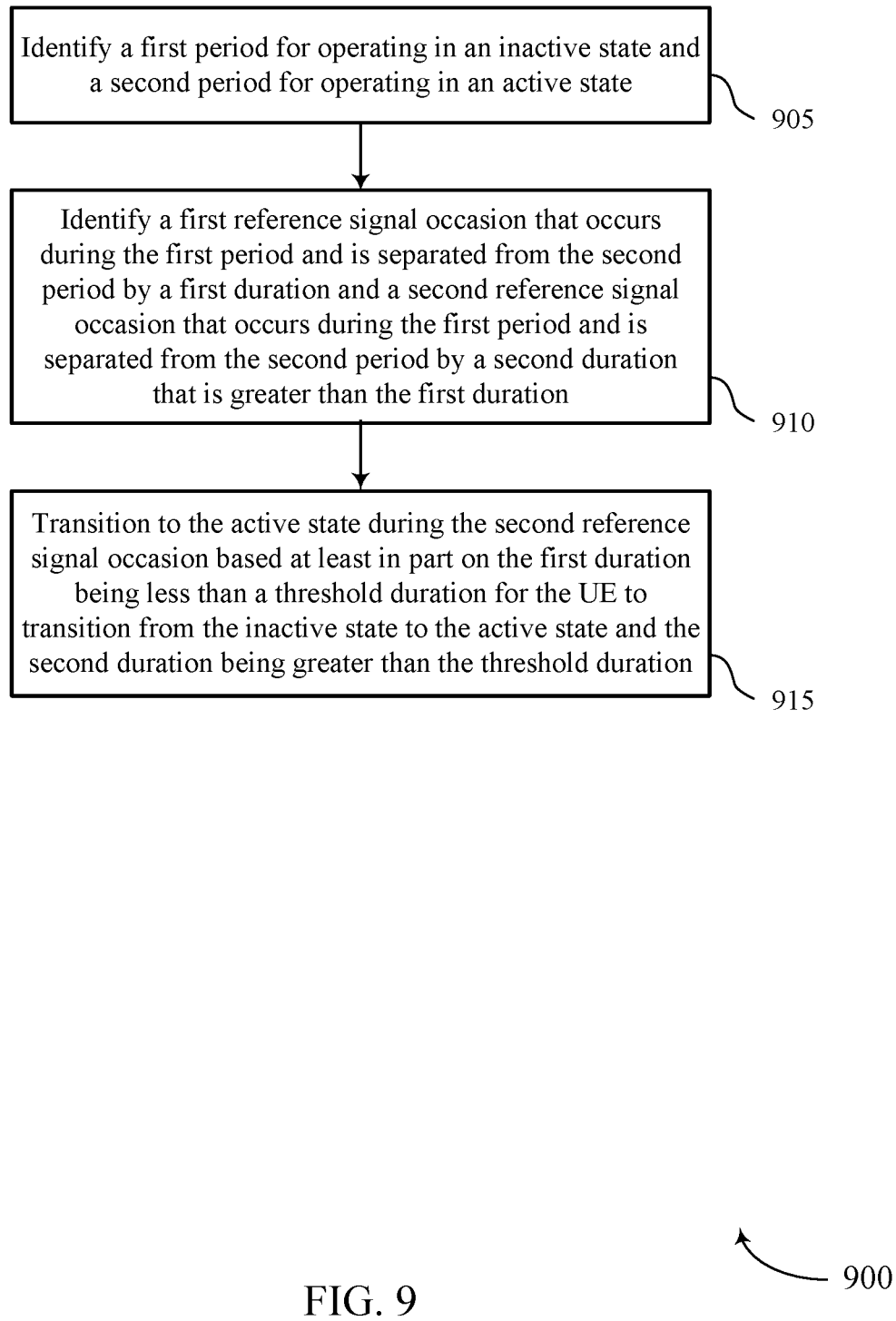
FIGS. 9 and 10 show flowcharts illustrating methods that support selecting reference signal occasions for wakeup in accordance with aspects of the present disclosure.

FIG. 9 shows a flowchart illustrating a method 900 for selecting reference signal occasions for wakeup in accordance with aspects of the present disclosure. The operations of method 900 may be implemented by a UE or its components as described herein. For example, the operations of method 900 may be performed by a UE 115 as described with reference to FIGS. 1 through 8. In some examples, a UE may execute a set of instructions to control the functional elements of the device to perform the described functions. Additionally, or alternatively, the UE may perform aspects of the described functions using special-purpose hardware.

At 905, the method may include identifying a first period for operating in an inactive state and a second period for operating in an active state. The operations of 905 may be performed according to the methods described herein. In some examples, aspects of the operations of 905 may be performed by a DRX component 710 as described with reference to FIG. 7.

At 910, the method may include identifying a first reference signal occasion that occurs during the first period and is separated from the second period by a first duration and a second reference signal occasion that occurs during the first period and is separated from the second period by a second duration that is greater than the first duration. The operations of 910 may be performed according to the methods described herein. In some examples, aspects of the operations of 910 may be performed by a reference signal component 715 as described with reference to FIG. 7.

At 915, the method may include transitioning to the active state during the second reference signal occasion based at least in part on the first duration being less than a threshold duration for the UE to transition from the inactive state to the active state and the second duration being greater than the threshold duration. The operations of 915 may be performed according to the methods described herein. In some examples, aspects of the operations of 915 may be performed by an activation component 720 as described with reference to FIG. 7.

Figure 10:
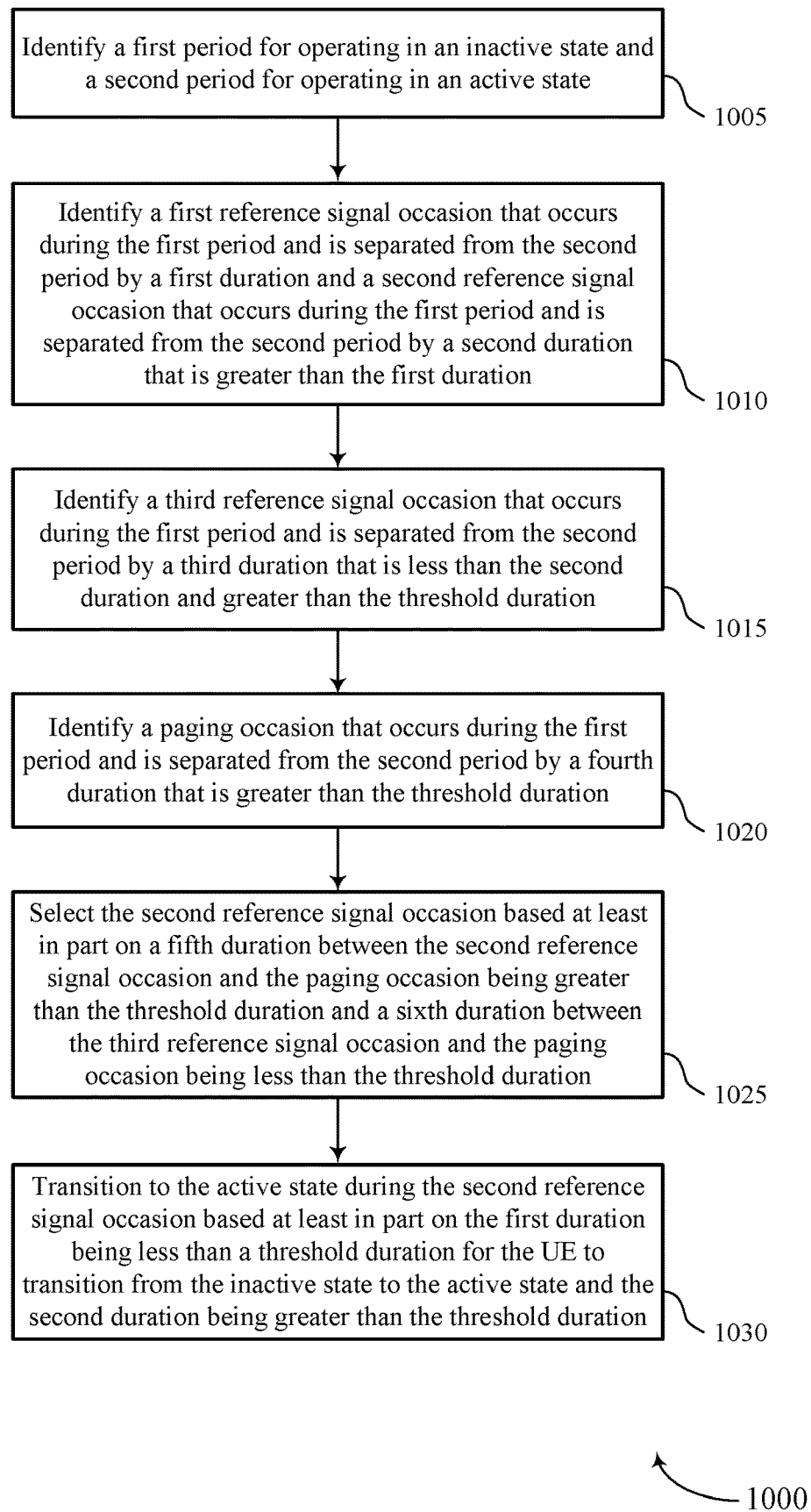

FIG. 10 shows a flowchart illustrating a method 1000 for selecting reference signal occasions for wakeup in accordance with aspects of the present disclosure. The operations of method 1000 may be implemented by a UE or its components as described herein. For example, the operations of method 1000 may be performed by a UE 115 as described with reference to FIGS. 1 through 8. In some examples, a UE may execute a set of instructions to control the functional elements of the device to perform the described functions. Additionally, or alternatively, the UE may perform aspects of the described functions using special-purpose hardware.

At 1005, the method may include identifying a first period for operating in an inactive state and a second period for operating in an active state. The operations of 1005 may be performed according to the methods described herein. In some examples, aspects of the operations of 1005 may be performed by a DRX component 710 as described with reference to FIG. 7.

At 1010, the method may include identifying a first reference signal occasion that occurs during the first period and is separated from the second period by a first duration and a second reference signal occasion that occurs during the first period and is separated from the second period by a second duration that is greater than the first duration. The operations of 1010 may be performed according to the methods described herein. In some examples, aspects of the operations of 1010 may be performed by a reference signal component 715 as described with reference to FIG. 7.

At 1015, the method may include identifying a third reference signal occasion that occurs during the first period and is separated from the second period by a third duration that is less than the second duration and greater than the threshold duration. The operations of 1015 may be performed according to the methods described herein. In some examples, aspects of the operations of 1015 may be performed by a reference signal component 715 as described with reference to FIG. 7.

At 1020, the method may include identifying a paging occasion that occurs during the first period and is separated from the second period by a fourth duration that is greater than the threshold duration. The operations of 1020 may be performed according to the methods described herein. In some examples, aspects of the operations of 1020 may be performed by a paging component 725 as described with reference to FIG. 7.

At 1025, the method may include selecting the second reference signal occasion based at least in part on a fifth duration between the second reference signal occasion and the paging occasion being greater than the threshold duration and a sixth duration between the third reference signal occasion and the paging occasion being less than the threshold duration. The operations of 1025 may be performed according to the methods described herein. In some examples, aspects of the operations of 1025 may be performed by a reference signal component 715 as described with reference to FIG. 7.

At 1030, the method may include transitioning to the active state during the second reference signal occasion based at least in part on the first duration being less than a threshold duration for the UE to transition from the inactive state to the active state and the second duration being greater than the threshold duration. The operations of 1030 may be performed according to the methods described herein. In some examples, aspects of the operations of 1030 may be performed by an activation component 720 as described with reference to FIG. 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying a first period for operating in an inactive state and a second period for operating in an active state;
    identifying a first reference signal occasion that occurs during the first period and is separated from the second period by a first duration and a second reference signal occasion that occurs during the first period and is separated from the second period by a second duration that is greater than the first duration; and
    transitioning to the active state during the second reference signal occasion based at least in part on the first duration being less than a threshold duration for the UE to transition from the inactive state to the active state and the second duration being greater than the threshold duration.

2. The method of claim 1, further comprising:
    receiving a reference signal during the second reference signal occasion.

3. The method of claim 2, wherein the reference signal comprises a synchronization signal block, a phase tracking reference signal, a remote interference management reference signal, a sounding reference signal, a demodulation reference signal, or a channel state information reference signal.

4. The method of claim 2, further comprising:
    receiving or sending a data or control message during the second period based at least in part on the reference signal received during the second reference signal occasion.

5. The method of claim 1, further comprising:
    determining, for the first reference signal occasion and the second reference signal occasion, an amount of time the UE will be awake during the first period and the second period together if the UE wakes up during a respective reference signal occasion; and
    selecting the second reference signal occasion for transitioning to the active state based at least in part on the second reference signal occasion being associated with a shorter amount of awake time than the first reference signal occasion.

6. The method of claim 5, wherein the second reference signal occasion is associated with a shortest amount of time for the UE to operate in the active state relative to a plurality of reference signal occasions that occur during the first period, and wherein the second reference signal occasion is selected based at least in part on being associated with the shortest amount of time.

7. The method of claim 1, further comprising:
identifying a third reference signal occasion that occurs during the first period and is separated from the second period by a third duration that is greater than the second duration; and
selecting the second reference signal occasion for transitioning to the active state based at least in part on the second duration being greater than the threshold duration, the third duration being greater than the second duration, and the first duration being less than the threshold duration.

8. The method of claim 1, further comprising:
receiving a configuration message indicating a first length of the first period, a second length of the second period, or both, and a starting location of a cycle that comprises the first period and the second period.

9. The method of claim 8, further comprising:
configuring a connected discontinuous reception mode based at least in part on the configuration message, wherein a connection is maintained with a base station throughout the first period and the second period based at least in part on the connected discontinuous reception mode being configured.

10. The method of claim 1, further comprising:
receiving a configuration message indicating a periodicity of and starting location for a set of reference signal occasions, wherein the first reference signal occasion and the second reference signal occasion are identified based at least in part on the configuration message.

11. The method of claim 1, further comprising:
identifying a third reference signal occasion that occurs during the first period and is separated from the second period by a third duration that is less than the second duration and greater than the threshold duration;
identifying a paging occasion that occurs during the first period and is separated from the second period by a fourth duration that is greater than the threshold duration; and
selecting the second reference signal occasion based at least in part on a fifth duration between the second reference signal occasion and the paging occasion being greater than the threshold duration and a sixth duration between the third reference signal occasion and the paging occasion being less than the threshold duration.

12. The method of claim 11, wherein the UE comprises a plurality of subscriber identification modules, and the first reference signal occasion and the second reference signal occasion being associated with a first subscription of the UE with a first operator and the paging occasion being associated with a second subscription of the UE with a second operator.

13. The method of claim 1, wherein the second period is non-overlapping with the first reference signal occasion or the second reference signal occasion.

14. An apparatus for wireless communication at a user equipment (UE), comprising:
a processor;
memory coupled with the processor; and
instructions stored in the memory and executable by the processor to cause the apparatus to:
identify a first period for operating in an inactive state and a second period for operating in an active state;
identify a first reference signal occasion that occurs during the first period and is separated from the second period by a first duration and a second reference signal occasion that occurs during the first period and is separated from the second period by a second duration that is greater than the first duration; and
transition to the active state during the second reference signal occasion based at least in part on the first duration being less than a threshold duration for the UE to transition from the inactive state to the active state and the second duration being greater than the threshold duration.

15. The apparatus of claim 14, wherein the instructions are further executable by the processor to cause the apparatus to:
receive a reference signal during the second reference signal occasion.

16. The apparatus of claim 14, wherein the instructions are further executable by the processor:
determine, for the first reference signal occasion and the second reference signal occasion, an amount of time the UE will be awake during the first period and the second period together if the UE wakes up during a respective reference signal occasion; and
select the second reference signal occasion for transitioning to the active state based at least in part on the second reference signal occasion being associated with a shorter amount of time than the first reference signal occasion.

17. The apparatus of claim 14, wherein the instructions are further executable by the processor:
identify a third reference signal occasion that occurs during the first period and is separated from the second period by a third duration that is greater than the second duration; and
select the second reference signal occasion for transitioning to the active state based at least in part on the second duration being greater than the threshold duration, the third duration being greater than the second duration, and the first duration being less than the threshold duration.

18. The apparatus of claim 14, wherein the instructions are further executable by the processor:
receive a configuration message indicating a first length of the first period, a second length of the second period, or both, and a starting location of a cycle that comprises the first period and the second period.

19. The apparatus of claim 14, wherein the instructions are further executable by the processor:
receive a configuration message indicating a periodicity of and starting location for a set of reference signal occasions, wherein the first reference signal occasion and the second reference signal occasion are identified based at least in part on the configuration message.

20. The apparatus of claim 14, wherein the instructions are further executable by the processor:
identify a third reference signal occasion that occurs during the first period and is separated from the second period by a third duration that is less than the second duration and greater than the threshold duration;
identify a paging occasion that occurs during the first period and is separated from the second period by a fourth duration that is greater than the threshold duration; and
select the second reference signal occasion based at least in part on a fifth duration between the second reference signal occasion and the paging occasion being greater than the threshold duration and a sixth duration between the third reference signal occasion and the paging occasion being less than the threshold duration.

21. An apparatus for wireless communication at a user equipment (UE), comprising:
- means for identifying a first period for operating in an inactive state and a second period for operating in an active state;
- means for identifying a first reference signal occasion that occurs during the first period and is separated from the second period by a first duration and a second reference signal occasion that occurs during the first period and is separated from the second period by a second duration that is greater than the first duration; and
- means for transitioning to the active state during the second reference signal occasion based at least in part on the first duration being less than a threshold duration for the UE to transition from the inactive state to the active state and the second duration being greater than the threshold duration.

22. The apparatus of claim 21, further comprising:
- means for receiving a reference signal during the second reference signal occasion.

23. The apparatus of claim 21, further comprising:
- means for determining, for the first reference signal occasion and the second reference signal occasion, an amount of time the UE will be awake during the first period and the second period together if the UE wakes up during a respective reference signal occasion; and
- means for selecting the second reference signal occasion for transitioning to the active state based at least in part on the second reference signal occasion being associated with a shorter amount of time than the first reference signal occasion.

24. The apparatus of claim 21, further comprising:
- means for identifying a third reference signal occasion that occurs during the first period and is separated from the second period by a third duration that is greater than the second duration; and
- means for selecting the second reference signal occasion for transitioning to the active state based at least in part on the second duration being greater than the threshold duration, the third duration being greater than the second duration, and the first duration being less than the threshold duration.

25. The apparatus of claim 21, further comprising:
- means for receiving a configuration message indicating a first length of the first period, a second length of the second period, or both, and a starting location of a cycle that comprises the first period and the second period.

26. The apparatus of claim 21, further comprising:
- means for receiving a configuration message indicating a periodicity of and starting location for a set of reference signal occasions, wherein the first reference signal occasion and the second reference signal occasion are identified based at least in part on the configuration message.

27. The apparatus of claim 21, further comprising:
- means for identifying a third reference signal occasion that occurs during the first period and is separated from the second period by a third duration that is less than the second duration and greater than the threshold duration;
- means for identifying a paging occasion that occurs during the first period and is separated from the second period by a fourth duration that is greater than the threshold duration; and
- means for selecting the second reference signal occasion based at least in part on a fifth duration between the second reference signal occasion and the paging occasion being greater than the threshold duration and a sixth duration between the third reference signal occasion and the paging occasion being less than the threshold duration.

28. A non-transitory computer-readable medium storing code for wireless communication at a user equipment (UE), the code comprising instructions executable by a processor to:
- identify a first period for operating in an inactive state and a second period for operating in an active state;
- identify a first reference signal occasion that occurs during the first period and is separated from the second period by a first duration and a second reference signal occasion that occurs during the first period and is separated from the second period by a second duration that is greater than the first duration; and
- transition to the active state during the second reference signal occasion based at least in part on the first duration being less than a threshold duration for the UE to transition from the inactive state to the active state and the second duration being greater than the threshold duration.

29. The non-transitory computer-readable medium of claim 28, wherein the code is further executable by the processor to:
- receive a reference signal during the second reference signal occasion; and
- receive a data message during the second period based at least in part on the reference signal received during the second reference signal occasion.

30. The non-transitory computer-readable medium of claim 28, wherein the code is further executable by the processor to:
- determine, for the first reference signal occasion and the second reference signal occasion, an amount of time for the UE to operate in the active state during the first period and the second period based at least in part on the first duration, the second duration, and the threshold duration; and
- select the second reference signal occasion for transitioning to the active state based at least in part on the second reference signal occasion being associated with a shorter amount of time than the first reference signal occasion.

* * * * *